Nov. 21, 1933. H. C. BOWEN ET AL 1,936,445
BRAKE MECHANISM
Filed Feb. 14, 1930 2 Sheets-Sheet 1
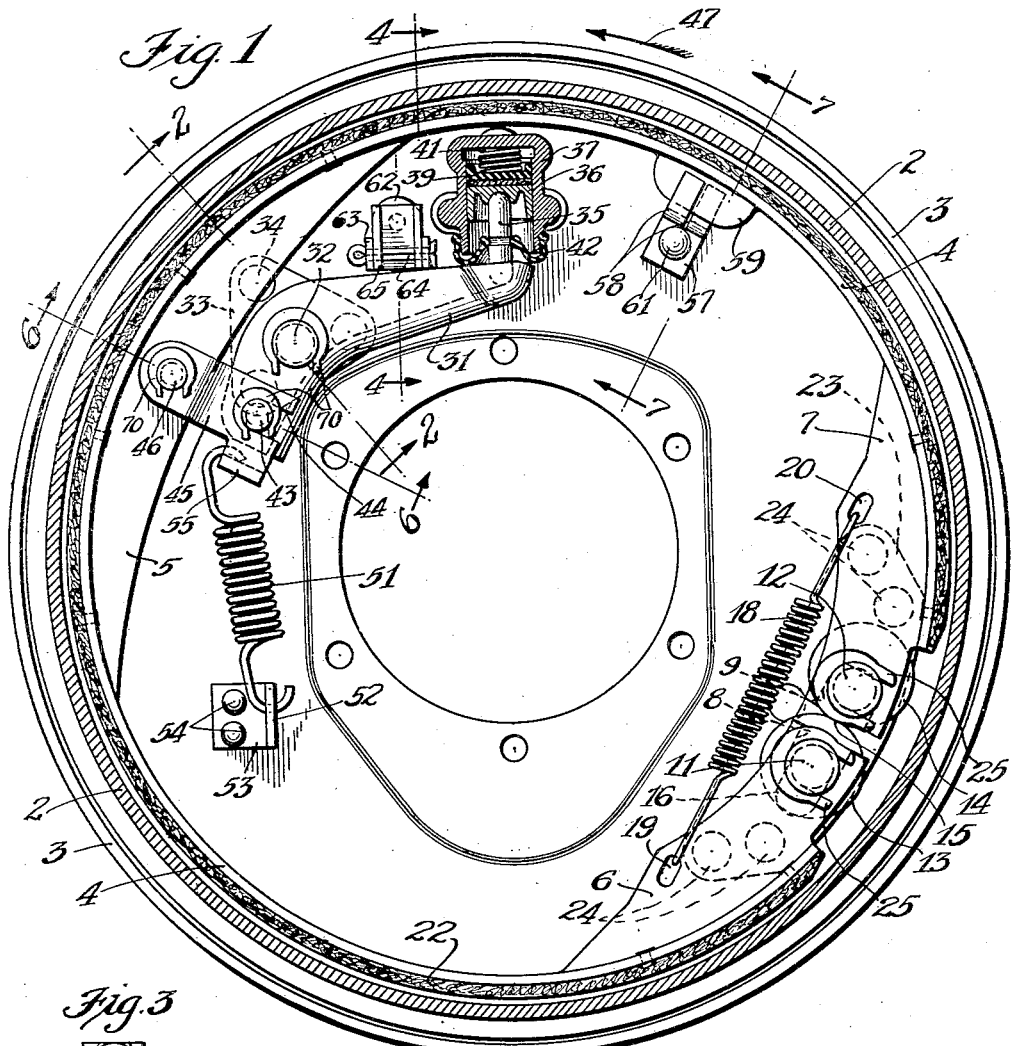
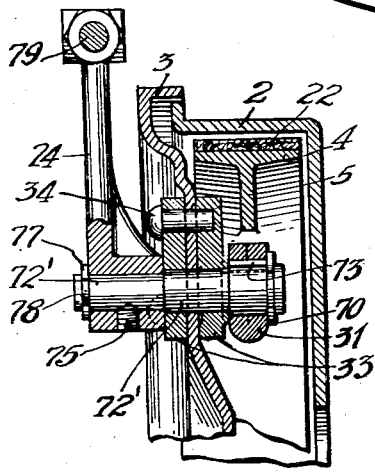
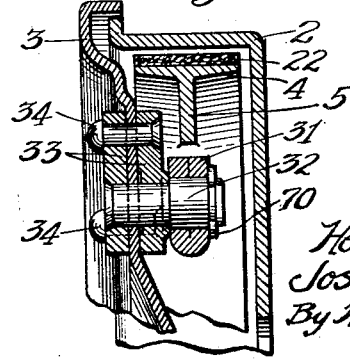
Inventors:
Herbert C. Bowen
Joseph R. Heidloff Nov. 21, 1933.    H. C. BOWEN ET AL    1,936,445
BRAKE MECHANISM
Filed Feb. 14, 1930    2 Sheets-Sheet 2
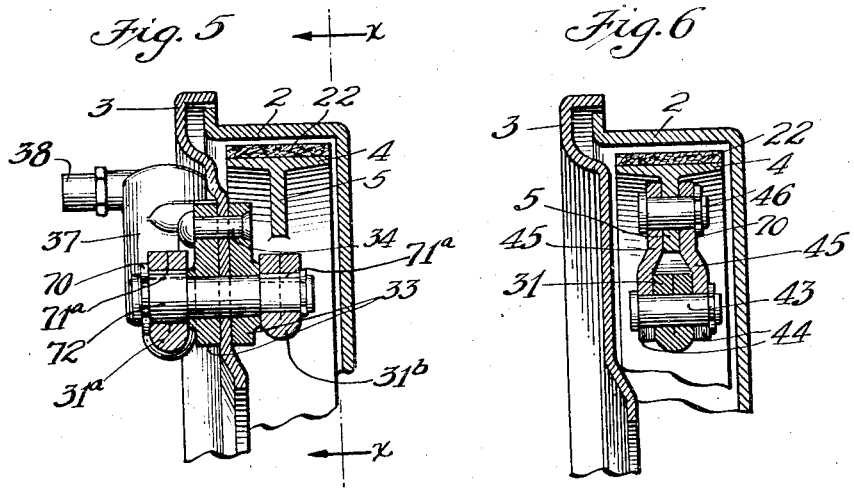
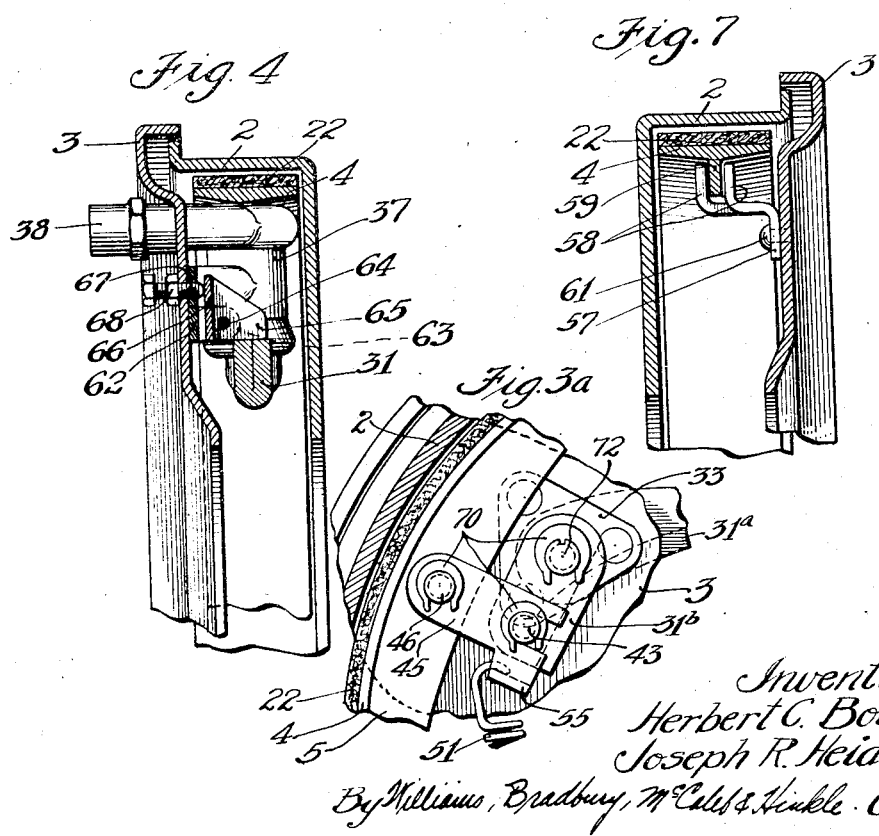
Inventors:
Herbert C. Bowen
Joseph R. Heidloff Patented Nov. 21, 1933

1,936,445

UNITED STATES PATENT OFFICE 1,936,445

BRAKE MECHANISM

Herbert C. Bowen and Joseph R. Heidloff, Detroit, Mich., assignors to Hydraulic Brake Company, Los Angeles, Calif., a corporation of California Application February 14, 1930. Serial No. 428,292

22 Claims. (Cl. 188—78)

This invention relates to a brake mechanism and more particularly to a mechanism of the type ordinarily employed on motor vehicles.

An object of this invention is the provision of a relatively inexpensive and simple brake mechanism adapted to effectively and efficiently operate a brake band into engagement with the brake drum through a relatively large arc and in a manner to avoid gripping or pounding action.

Another object is the provision of an improved force applying mechanism for the brake band which actuates the shoe in a manner to produce an equal braking torque in either direction of rotation of the drum.

Other objects and advantages will become apparent from the following specification and the appended claims.

In the accompanying drawings,

Fig. 1 is a vertical section taken through a brake drum and looking in the direction of the band and its supporting pan;

Fig. 2 is a section taken on the line 2—2 of Fig. 1;

Fig. 3 is a section similar to Fig. 2 but showing a modification of my invention;

Fig. 3a is a section taken on the line x—x of Fig. 5;

Fig. 4 is a section taken on the line 4—4 of Fig. 1;

Fig. 5 is a section similar to Fig. 4, but showing a modified form of my invention;

Fig. 6 is a section taken on the line 6—6 of Fig. 1; and

Fig. 7 is a section taken on the line 7—7 of Fig. 1.

Applicant is aware of brake mechanisms employing a single internal band of the type shown in the patent to Alanson P. Brush, No. 1,652,757 issued December 13, 1927, but the invention set forth in these drawings is an improvement over that patent and other patents of the prior art of a similar nature.

The brake drum 2 is of any conventional form and is disposed adjacent the pan 3 which supports the brake mechanism and the brake band 4 for cooperation with the drum. The brake band 4 is provided with a relatively wide and long arcuate reinforcing rib 5 which is opposite the ends of the band. The ends of the band 4 are preferably provided with reinforcing ribs 6 and 7 which have apertures 8 and 9 of U-shape in their ends and oppositely disposed for receiving pivot pins 11 and 12 on which the band may have pivotal movement during its operation.

The pins 11 and 12 are provided with disc-like stampings 13 and 14 which are fitted on the pins and abut each other at 15. The pivot pin 11 is adapted to slide laterally in the slot 16 in the pan 3 and this sliding movement may be forced by the rotation of the disc 14, which is eccentrically positioned on pin 12 and fixed for rotation therewith. For a more specific illustration and description of the pivots 11 and 12 and their associated mechanism, reference may be had to our copending application, Serial No. 428,293, filed February 14, 1930, now Patent No. 1,885,174, dated November 1, 1932.

A coil spring 18 having its ends engaging in apertures 19 and 20 in the ribs 6 and 7 respectively urges the pins 11 and 12 toward each other, but is adapted to yield when the disc 14 is rotated for permitting the desired adjustment in the distance between pivots 11 and 12 for the purpose of compensating for wear on the brake lining 22 on the band 4. The pan 3 is preferably provided with a reinforcing plate 23 fixed in place by rivets 24 for the purpose of taking the strain at the point where the pivots 11 and 12 are attached.

Suitable spring collars 25 engage the pins 11 and 12 adjacent their inner ends for preventing the band from becoming disengaged from the pivots. The detailed features of this adjusting mechanism are to be made the subject matter of another application for patent and further description thereof in this application is thought to be unnecessary.

For the purpose of forcing the brake band 4 into frictional engagement with the drum 2 we provide a bell crank lever 31, which may consist of a single sheet of metal folded in the manner shown in Figure 6 and being pivoted on the pin 32. The pan 3 is provided with reinforcing blocks 33 fixed to the pan by rivets 34 to provide a rigid portion through which the pin 32 is secured. One end of the bell crank lever 31 is adapted to receive the lower end of a piston rod 35 which engages a piston 36 in the cylinder 37 which is adapted to receive fluid pressure through an intake coupler 38 shown in Figure 4.

A cup 39, composed preferably of rubber or the like material, is seated on the piston 36 and is held thereon by a coil spring 41. A suitable boot 42 is placed about the lower end of cylinder 37 and engages the piston rod 35 to prevent the access of dust and other foreign matter to the bore of the cylinder. The opposite end of bell crank lever 31 is provided with a pin 43 which engages within an aperture 44 in one end of a link 45 which is pivoted by a pin 46 to the rib 5 on the pan 4.

By this arrangement when hydraulic pressure forces downwardly on the piston and piston rod engaging the upper end of lever 31, the lever moves about the pin 32 as an axis, forcing the pin 43 against the rear side of the aperture 44 in the link 45, causing the same to force against the pin 46 in the rib 5 and press the band forcibly against the drum 2 which in the forward movement of the vehicle is rotating in the direction of the arrow 47.

Upon engagement of the band with the drum, it rotates with the drum a short distance, which is sufficient to cause the band to firmly engage the drum substantially the entire distance from the rib 5 to the end of which rib 6 is a portion. The pivot 11 being fixed, it prevents rotation of the end of the band 4 with the drum and a braking action is caused throughout approximately three-fourths the length of the band. This rotating action of the brake band prevents gripping or pounding upon application of the brake and it has been found to be a very satisfactory brake which is relatively simple and very economical to manufacture.

Upon the release of fluid pressure the band is withdrawn from engagement with the drum by means of a coil spring 51 having its lower end engaged through a flange 52 on a clip 53 fixed to the pan 3 by rivets 54. The upper end of spring 51 engages a lug 55 on the lower side of link member 45 and urges rearwardly on the link, although it is adapted to yield when sufficient force is applied to the lever 31 as above set forth.

As best shown in Figure 7, means has been provided for guiding the band throughout its range of movement and preferably consists of a clip member 57 having fingers 58 on its upper end forming a way into which the flange 59 of the band 4 may pass. The clip 57 is secured to the pan 3 by means of a rivet 61.

In order to prevent excessive lost motion in the operation of the brake, an adjustable stop member has been provided which engages the upper side of lever 31 when pressure is released from the cylinder 37. This stop member consists of a plate 62 having lateral flanges 63 to which is pivoted by means of a cotter key 64 a stop element 65. The stop element 65 has a web 66 adapted to be engaged by the forward end of a set screw 67 which passes through the pan 3 and is fixed in any desired adjusted position by means of a nut 68 thereon engaging the outer side of the pan.

In Figs. 5 and 3a is shown a modification of this invention in which the cylinder 37 is fixed on the outside of the pan 3 instead of on the inside as shown in the preferred construction illustrated in Fig. 4. In this modification the shaft 72 passes outwardly through the reinforcing blocks 33 and supports the arms 31a and 31b on its outer and inner ends respectively to which they are secured by keys 71a forming in effect a single rigid bell crank arm similar to arm 31 in Fig. 1. The shaft 72 and pins 43, 32 and 46 are preferably provided with spring collars 70 for holding the mechanism assembled thereon.

In Figure 3 we have shown another modification which provides for mechanical as well as hydraulic operation of the link 45 for pressing the band 4 against the drum. In this modification the reinforcing plates or blocks 33 support a shaft 72' which has the arm 31 secured for rotation therewith on the inner end by means of a key 73 and spring collar 70. To the outer end of the shaft is fixed an upstanding arm 74 by a set screw 75. To prevent the removal of the arm 74 from the shaft 72', a spring collar 77 is fitted to the outer end of the shaft in an annular recess 78. The upper end of arm 74 is fixed to a suitable pull rod 79 which may be operated in any desired manner.

Although the preferred forms of this invention have been described and illustrated in the drawings, it will be apparent to those skilled in the art that it is susceptible to various changes without departing from the scope of our invention which is set forth in the appended claims.

We claim as our invention.

1. In a brake mechanism, the combination of a brake drum with a band, relatively adjustable, normally stationary pivots engaging in apertures in the ends of said band, said pivots preventing radial movement of said ends relative to said drum, and means for applying force to the mid portion of said band and forcibly pressing it against the drum.

2. In a brake mechanism, the combination of a brake drum with a friction member adapted for cooperation with said drum, a non-rotatable support for said friction member, means individually pivoting the ends of said friction member to said support, said pivoting means preventing radial inward movement of said ends relative to said drum, means for effecting relative lateral adjustment of said pivots, and force applying mechanism adapted to actuate an intermediate portion of said friction member against said drum.

3. In a brake mechanism, the combination of a brake drum with a friction member adapted for cooperation with said drum, a non-rotatable support for said friction member, means pivoting the ends of said friction member to said support, means for effecting relative lateral adjustment of said pivots, said pivots preventing radial movement of said ends relative to said drum, and force applying means operatively connected to an intermediate portion of said friction member for actuating it against the drum.

4. In a brake mechanism, the combination of a brake drum with a friction member adapted for cooperation with said drum, a non-rotatable support for said friction member, means pivoting the ends of said friction member to said support, said pivoting means preventing outward radial movement of said ends relative to said drum, means for effecting relative lateral adjustment of said pivots, said friction member comprising an arcuate reinforcing rib, and force applying means operably connected with said rib for actuating said friction member against said drum.

5. In a brake mechanism, the combination of a brake drum with a band, relatively adjustable, normally stationary pivots engaging in apertures in the ends of said band and preventing radial movement of said ends relative to said drum, means for applying force to the mid portion of said band and forcibly pressing it against the drum, and means for retracting said band from engagement with the drum.

6. In a brake mechanism, the combination of a brake drum with a friction member adapted for cooperation with said drum, a non-rotatable support for said friction member, means individually pivoting the ends of said friction member to said support, said pivoting means preventing radial movement of said ends relative to said drum, and force applying mechanism adapted to actuate an intermediate portion of said friction member against said drum, and means for retracting said friction member from said drum.

7. In a brake mechanism, the combination of a brake drum with a friction member adapted for cooperation with said drum, a non-rotatable support for said friction member, means pivoting the ends of said friction member to said support, means preventing radial movement of said ends relative to said drum, means for effecting relative lateral adjustment of said pivots, said friction member comprising an arcuate reinforcing rib, force applying means operably connected with said rib for actuating said friction member against said drum, and means for retracting said friction member from engagement with said drum.

8. In a brake mechanism, the combination of a drum with a band disposed adjacent thereto for frictional cooperation therewith, an arcuate reinforcement on said band intermediate its ends, a support for said band, relatively adjustable pivots fitted in apertures in said band adjacent its ends and secured to said support, said pivots preventing radial movement of said ends relative to said drum, and lever means for applying radial force to said reinforcement to actuate said band against said drum.

9. In a brake mechanism, the combination of a drum with a band disposed adjacent thereto for frictional cooperation therewith, an arcuate reinforcement on said band intermediate its ends, a support for said band, relatively adjustable pivots fitted in apertures in said band adjacent its ends and secured to said support, said pivots preventing radial movement of said ends relative to said drum, and force applying mechanism operatively connected with said band for actuating said band against said drum.

10. In a brake mechanism, the combination of a drum with a band disposed adjacent thereto for frictional cooperation therewith, an arcuate reinforcement on said band intermediate its ends, a support for said band, relatively adjustable pivots fitted in apertures in said band adjacent its ends and secured to said support, said pivots preventing radial movement of said ends relative to said drum, and force applying mechanism operatively connected with said reenforcement for actuating said band against said drum, said force applying mechanism comprising a hydraulic cylinder and piston and means operatively connecting said piston to said band.

11. In a brake mechanism, the combination of a drum with a band disposed adjacent thereto for frictional cooperation therewith, an arcuate reinforcement on said band intermediate its ends, a support for said band, relatively adjustable pivots fitted in apertures in said band adjacent its ends and secured to said support, said pivots preventing radial movement of the ends of said band relative to said drum, and force applying mechanism operatively connected with said reenforcement for actuating said band against said drum, said force applying mechanism comprising a fluid pressure cylinder and piston, a piston rod, a bell crank arm having one end engaged by said piston rod, the other end of which transmits radial force to said band.

12. In a brake mechanism, the combination of a drum with a band disposed adjacent thereto for frictional cooperation therewith, an arcuate reinforcement on said band intermediate its ends, a support for said band, pivots fitted in apertures in said band adjacent its ends and secured to said support, and force applying mechanism operatively connected with said band for actuating said band against said drum, said force applying mechanism comprising a fluid pressure cylinder and piston, a piston rod, a bell crank lever having one end engaged by said piston rod and a link pivoted to said band and having lost motion connection with the other end of said bell crank lever.

13. In a brake mechanism, the combination of a drum with a band disposed adjacent thereto for frictional cooperation therewith, an arcuate reinforcement on said band intermediate its ends, a support for said band, pivots fitted in apertures in said band adjacent its ends and secured to said support, and force applying mechanism operatively connected with said band for actuating said band against said drum, said force applying mechanism comprising a fluid pressure cylinder and piston, a piston rod, a bell crank lever having one end engaged by said piston rod and a link pivoted to said band and having lost motion connection with the other end of said bell crank lever, means for guiding said band throughout its range of movement and means for retracting said band from engagement with said drum.

14. In a brake mechanism, the combination of a drum with a band disposed adjacent thereto for frictional cooperation therewith, an arcuate reinforcement on said band intermediate its ends, a support for said band, pivots fitted in apertures in said band adjacent its ends and secured to said support, and force applying mechanism operatively connected with said band for actuating said band against said drum and means for laterally adjusting said pivots.

15. In a brake mechanism, the combination of a drum with a band disposed adjacent thereto for frictional cooperation therewith, an arcuate reinforcement on said band intermediate its ends, a support for said band, pivots fitted in apertures in said band adjacent its ends and secured to said support, and force applying mechanism operatively connected with said band for actuating said band against said drum, said force applying mechanism comprising a hydraulic cylinder and piston, means operatively connecting said piston to said band and means for laterally adjusting said pivots.

16. In a brake mechanism, the combination of a drum with a band disposed adjacent thereto for frictional cooperation therewith, an arcuate reinforcement on said band intermediate its ends, a support for said band, pivots fitted in apertures in said band adjacent its ends and secured to said support, and force applying mechanism operatively connected with said band for actuating said band against said drum, said force applying mechanism comprising a fluid pressure cylinder and piston, a piston rod, a bell crank lever having one end engaged by said piston rod, a link pivoted to said band and having lost motion connection with the other end of said bell crank lever, and means for laterally adjusting said pivots.

17. In a brake mechanism, the combination of a drum with a band disposed within said drum for frictional engagement with the inner circumference thereof, a support for said band, pivots passing through apertures in the end portions of said band and secured to said support adjacent each other, means for effecting relative lateral adjustment of said pivots, means urging said pivots toward each other, a relatively long arcuate rib on said band diametrically opposite said pivots, and means for applying force radially to said rib for actuating said band against said drum.

18. In a brake mechanism, the combination of a drum with a band disposed within said drum for frictional engagement with the inner circumference thereof, a support for said band, pivots passing through apertures in the end portions of said band and secured to said support adjacent each other, means for effecting relative lateral adjustment of said pivots, means urging said pivots toward each other, a relatively long arcuate rib on said band diametrically opposite said pivots and a mechanically and hydraulically operable shaft having operative connection with said rib for actuating said band.

19. In a brake mechanism, the combination of a drum with a band disposed within said drum for frictional engagement with the inner circumference thereof, a support for said band, pivots passing through apertures in the end portions of said band and secured to said support adjacent each other, means for effecting relative lateral adjustment of said pivots, means urging said pivots toward each other, a relatively long arcuate rib on said band diametrically opposite said pivots, lever means operatively connected to said rib for actuating said band and means for actuating said lever means.

20. In mechanism of the class described, the combination of a rotatable member, a friction member adapted to be brought into braking engagement therewith, means for moving an intermediate portion of said friction member in a given direction toward said rotatable member, and means preventing the ends of said friction member from moving in said given direction.

21. In mechanism of the class described, the combination of a brake drum, a friction member adapted to be brought into braking engagement with said drum, means for moving an intermediate portion of said friction member in a radial direction to engage said drum, and means engaging the ends of said member and holding said ends against movement in said radial direction.

22. In brake mechanism of the class described, the combination of a brake drum, a brake band adapted to be brought into braking engagement with said drum, means for forcing the medial portion of said band into engagement with said drum, and means preventing movement of the ends of said band toward said medial portion.

HERBERT C. BOWEN.
JOSEPH R. HEIDLOFF.